United States Patent

Wanka et al.

[11] 3,898,295
[45] Aug. 5, 1975

[54] REACTION APPARATUS FOR CARRYING OUT CATALYTIC REACTIONS IN SEVERAL STAGES

[75] Inventors: Oskar Wanka, Deggendorf, Danube; Friedrich Gütlhuber, Metten; Cedomil Persic, Deggendorf, Danube, all of Germany

[73] Assignee: Deggendorfer Werft und Eisenbau GmbH, Germany

[22] Filed: Apr. 25, 1973

[21] Appl. No.: 354,464

[30] Foreign Application Priority Data
Apr. 29, 1972  Germany.......................... 2221288

[52] U.S. Cl.............. 423/659; 23/288 H; 23/288 K; 165/35; 165/107; 260/515 P; 260/537 N; 260/700
[51] Int. Cl..... B01j 9/04; F28d 15/00; G05d 23/00
[58] Field of Search.......... 23/288 K, 288 H, 288 R, 23/289; 423/659; 165/35, 107; 122/4 D; 260/700

[56] References Cited
UNITED STATES PATENTS

| 1,741,308 | 12/1929 | Jaeger | 23/288 K |
|---|---|---|---|
| 1,959,898 | 5/1934 | Brode et al. | 23/288 H |
| 2,078,948 | 5/1937 | Houdry | 23/288 K |
| 2,248,734 | 7/1941 | Barr | 23/288 K UX |
| 2,585,462 | 2/1952 | Hirsch | 23/288 K |
| 2,898,183 | 8/1959 | Fauser | 23/289 X |
| 3,395,982 | 8/1968 | Didycz | 23/289 UX |

FOREIGN PATENTS OR APPLICATIONS

| 106,420 | 2/1943 | Sweden | 23/288 R |
|---|---|---|---|
| 2,033,367 | 7/1971 | Germany | 23/288 K |

*Primary Examiner*—Joseph Scovronek
*Attorney, Agent, or Firm*—McGlew and Tuttle

[57] ABSTRACT

A multistage reaction apparatus for carrying out exothermic or endothermic catalytic reactions comprises a plurality of separate stages which are arranged sequentially within the reaction vessel and consecutively passed through by the reaction gas. Each stage includes a separately removable case filled with a catalyst, and a gas cooler in the form of a heat exchanger mounted downstream of the case. The catalysts of the individual stages may be different as to their quantity and/or nature. Each heat exchanger represents a controllable partial cooling circuit and all of the exchangers are interconnected by a common circulation system serving to balance out larger temperature variations and to supply the partial circuits. The common circuit, including a main heat exchanger, may comprise a pump mounted in the return branch or branches of the circuit and the partial circuits or exchangers are controlled by valves or three-way control members and may also each comprise a pump. In the case of carrying out endothermic reactions, the cooling devices are replaced by appropriate heating systems.

7 Claims, 6 Drawing Figures

REACTION APPARATUS FOR CARRYING OUT CATALYTIC REACTIONS IN SEVERAL STAGES

BACKGROUND OF THE INVENTION

1. Field Of The Invention

The present invention relates in general to devices for chemical catalytic processes and, in particular, to a new and useful multistage reaction apparatus for carrying out exothermic or endothermic catalytic reactions in which the reaction gas subsequently passes through several beds of catalysts placed in transversely arranged cases and is cooled down or heated up in each such stage by means of a heat exchanger whose partial medium circuit is controllable by valves or three-way control members and with the aid of a main circulation system so as to hold the temperature of the reaction gas uniformly distributed over the cross-section of the reactor and, at the entrance of the stages, on the substantially same level.

2. Description Of The Prior Art

Reaction apparatus for carrying out exothermic or endothermic chemical reactions are mostly designed as tube reactors in which the catalyst to be passed through by a reaction gas is located in contact tubes. To obtain a satisfactory elimination of the heat developed by an exothermic reaction, a relatively large tube surface is necessary. That is why, for large output capacities, a great many, i.e., thousands of tubes, must be provided which are externally in contact with a heat exchanging medium, for example, a fused salt. These contact tubes occupy a relatively large total cross-sectional area which, along with the necessary spacing of the tubes, results in very considerable dimensions of the reaction vessel.

The principal drawbacks of such types of tube reactors are the time which is necessary for the removal of the used catalyst from the contact tubes and subsequent filling with a new catalyst, which partly causes service interruptions taking several weeks and, a limitation of the reactor capacity because, with respect to the transportation conditions, it is impossible to increase the number of tubes and, thereby, the dimensions of the reactor indefinitely.

There is known, a type of reaction apparatus called hurdle reactors, wherein the catalyst is placed in several cases and the reaction gas is sequentially passed therethrough in several stages. Up to date, this type has been used only for smaller units and for processes which are very sensitive because the risk of the reaction becoming uncontrollable is very great, particularly for temperature sensitive exothermic reactions in which organic substances are reacted together (the preparation of phthalic acid, maleic acid, etc.).

GENERAL DESCRIPTION OF THE INVENTION

The present invention avoids the above-mentioned shortcomings by providing a reaction apparatus of the multistage hurdle-type comprising a plurality of cases which are arranged in a reaction vessel at appropriate mutual distances and so as to be removable for exchange, filled with a catalyst, and adapted to be successively passed through by a reaction gas. The invention provides further to mount a cooler or auxiliary heat exchanger for the reaction gas downstream of each case and to use a heat exchanging medium having an evaporation temperature of more than 100°C under normal pressure. All of the auxiliary heat exchangers are interconnected by a common circulation system including a supply conduit, a return conduit, and a main heat exchanger. Each partial circuit of the heat exchange medium in the individual auxiliary heat exchanger of each stage is separately controllable and connected to the common circulation system by branch conduits.

In a further development of the invention, there is provided a separate circulation pump for each auxiliary heat exchanger. Instead of these separate circulation pumps, or under certain circumstances in addition to these separate circulation pumps, a main circulation pump may be provided in the circulation system common for all stages.

The circulation system common for all stages may also consist of two supply conduits parallel to each other, each comprising a circulation pump and a return conduit. In this case, the main heat exchanger is provided in only one of the supply conduits and the individual heat exchangers of each stage are connected to both of the supply conduits through branch conduits and three-way control members.

In order to make such a reaction apparatus easily adaptable to various reaction processes and service conditions, some other measures are recommendable in addition, separately or in combination. There may be provided:

a. heat exchangers with removable nests of tubes;
b. a removable housing cover adjacent each case containing the catalyst permitting removal of the respective case;
c. different quantities of catalyst in the individual cases; and
d. catalysts of different nature in the individual cases.

In using a reaction apparatus designed in accordance with the invention, it is possible, even in multistage reaction processes, to avoid the disadvantageous consequences of an unexpected temperature change of the inflowing gas. Such temperature variations are corrected by means of automatically controlled regulating members which are associated with each heat exchanger and ensure that, in order to more or less influence the temperature of the reaction gas just having passed through the catalyst bed of the respective stage, a larger or smaller partial stream of the exchange medium is branched off the common circulation system and supplied into the circuit of the heat exchanger.

It is advisable to keep the temperature difference between the reaction gas and the heat exchange medium which is conducted through the respective heat exchangers very small. The purpose thereof is not only to prevent any further increase of the reaction gas temperature differences within the range of a cross-section of the reaction vessel, but also, if possible, to equalize the same. To this end, it is also necessary to provide sufficiently large surfaces of the nests of tubes in the different heat exchangers so as to assure a sufficient inertness of the whole heat exchange system against sudden temperature variations at any place.

This requirement can be met in taking into account the following two conditions for the dimensioning of the cooling surface:

1. $\Delta t_1 \geq \Delta t_2$
2. $\dfrac{t_{k2} - t_s}{t_{k2} - t_s} = \dfrac{t'_{k2} - t_s}{t_{k'2} - t_s}$ wherein $t$ and $t'$ are the lowest and highest gas temperature, respectively, appearing in the considered cross-sectional area of the reactor perpendicular to the flow direction of the reaction gas (cf. FIG. 6) $t_x$ is the temperature of the heat exchanging medium. The indices E and A relate to the inlet side and outlet side of the concerned reactor part.

In this consideration, the temperature of the heat exchange medium in a heat exchanger is assumed as being constant over the whole cooling cross-sectional area. In the present construction, this assumption is justified because the design of the heat exchangers, as well as the high possible rate of circulation (for example in the order of 10,000 m³/h), result in negligibly small temperature variations over the cooling cross-sectional area.

Accordingly, it is an object of the invention to provide a reaction apparatus for catalytic processes which, in order to permit a carrying out of exothermic or endothermic reactions in several stages, comprises a plurality of appropriately spaced cases which are arranged in the reaction vessel so as to be removable for exchange, and which are filled with a catalyst and adapted to be successively passed through by a reaction gas.

Another object of the invention is to provide a heat exchanging system using a heat exchange medium having an evaporation temperature of more than 100°C under normal pressure and comprising individual heat exchangers in each stage mounted downstream of the respective catalyst case and a main heat exchange circuit common for all of the individual heat exchangers and serving to supply them as well as to equalize the temperature variations.

Another object of the invention is to provide circulation and control means for both the individual and common heat exchange circuits, in particular, to provide pumps in the individual circuits of the stage heat exchangers and/or at least one main pump in the common heat exchange circuit and control valves or members, preferably three-way members in the branch conduits connecting the individual circuits to the common circuit and serving to control the temperature of the heat exchange medium in the individual stage circuits.

Another object of the invention is to provide a common heat exchange system comprising at least one supply conduit, a return conduit and a main heat exchanger mounted in one of the supply conduits which are connected in parallel.

A further object of the invention is, in order to facilitate and accelerate the service, to provide the heat exchangers with nests of tubes which are demountable and the reaction vessel with covers which are located in the zone of each catalyst case and removable so as to permit to take out the individual cases.

Still another object of the invention is to provide in the individual catalyst cases, mutually different quantities of catalyst and/or catalysts of different nature.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
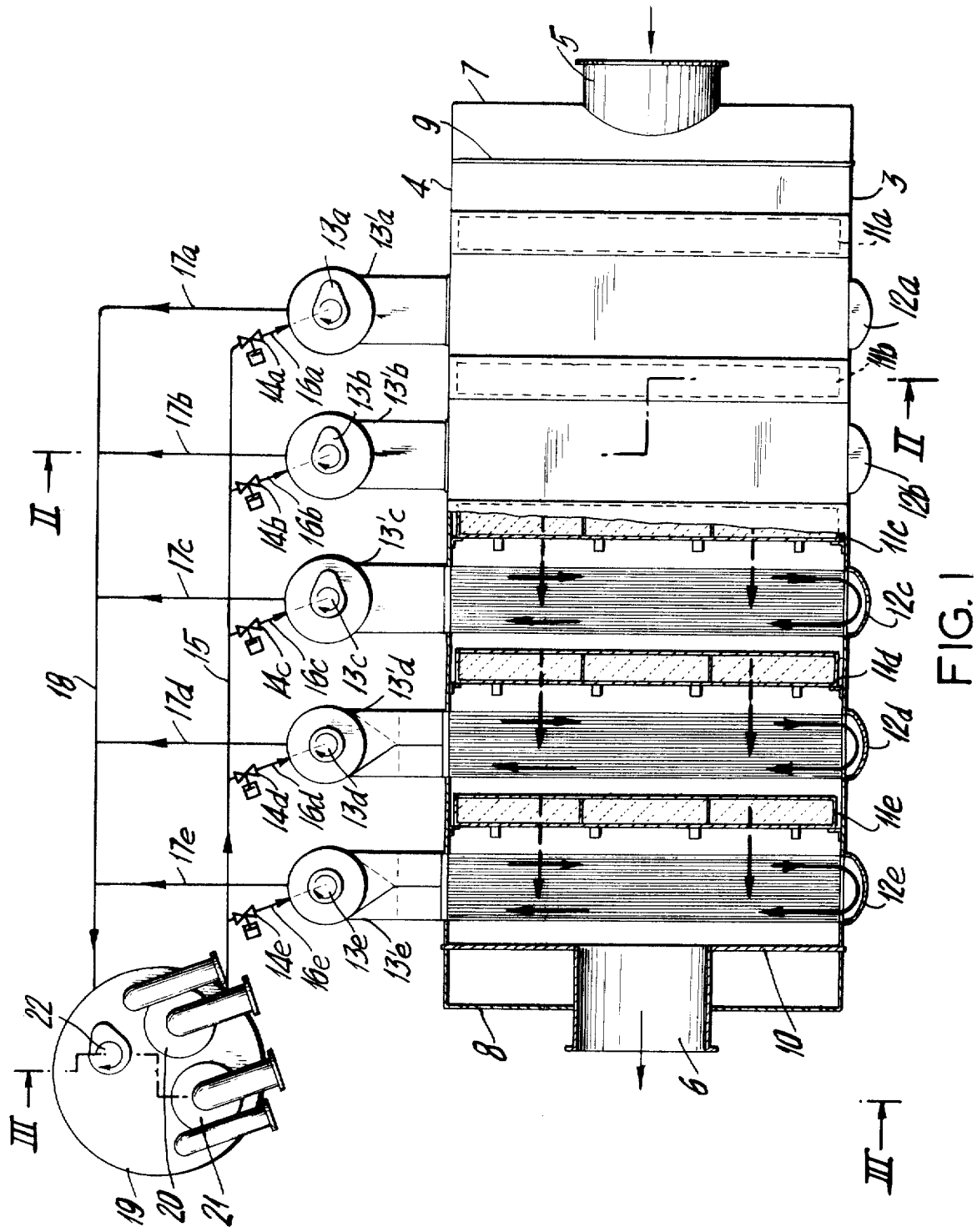
FIG. 1 is a schematic top plan view of a reaction apparatus according to the invention, designed for an exothermic process.

Referring to the drawings in particular, the invention comprises, a reaction vessel in a horizontal arrangement and having a rectangular cross-section which is limited by a metal sheet jacket comprising a bottom sheet 1, a top sheet 2, and two lateral end sheets 3 and 4. In the two end portions of the vessel, there are provided tubular sockets or fittings 5, 6, which are welded into front metal sheets 7, 8 as well as into supporting metal sheets 9, 10 mounted in a certain distance therefrom. The fittings 5 and 6 define a reaction gas inlet and discharge, respectively. Five cases 11a – 11e, containing a catalyst, are arranged within the reaction vessel and located in crosswise position in appropriate distances along the whole length of the vessel. The passage height or thickness of the individual catalyst beds may be mutually equal or differ from each other, according to the particular nature of the reaction process. Downstream of each catalyst case, i.e., in the flow direction of the reaction gas which enters through the tubular socket inlet 5 and flows out through the tubular socket discharge 6, there are mounted coolers 12a – 12e which serve as auxiliary heat exchangers having tubes extending over the whole cross-section of the reaction vessel.

Each cooler is equipped with a respective pump 13a – 13e located in a separate housing 13'a – 13'e (FIG. 2) and with a valve 14a – 14e (FIG. 1) mounted upstream in a branch conduit 16a – 16e which is connected to a common medium supply conduit 15. Other branch conduits 17a – 17e connect a common return conduit 18 to the outlets of coolers 12a – 12e which are connected to the suction side of the pumps 13a – 13e.

A common circulation system for all the auxiliary heat exchangers 12a to 12e includes a return conduit 18 and a supply conduit 15 along with a main heat exchanger, connected therebetween and comprising two nests of tubes 20, 21 located in a housing 19, and a main circulation pump 22 mounted in the same housing.

The temperature of the coolant is increased by the reaction gas which, after having been heated up by the reaction taking place during its passage through the respective catalyst case 11a – 11e, passes transversely through the respective coolers 12a – 12e and is thereby cooled down.

In view of the fact that within the range of each reaction stage, the temperature may vary in an unforeseen manner, care must be taken, by an appropriate control in the zone of each downstream connected cooler, to assure approximately the same temperature of the reaction gas before its entrance into each following reaction stage. This is obtained by means of individual valves 14a – 14e which can automatically be adjusted by temperature sensors and through which the partial quantities of the cooled down medium delivered by the supply conduit 15 and furnished to each cooler are controlled. The unfavorable effect of any undesirable change of the temperature conditions on the subsequent zones of the apparatus may thus be prevented.

Further advantages of a reaction apparatus designed in accordance with the invention are to be seen in the possibility of obtaining high performances, for example, a throughput in the order of 800,000 kg/h of reaction gas and a removable heat increase of 60 millions kcal/h, in a relatively small input power necessary for the compressors of the reaction gas which is due to the small thickness and, consequently, small flow resistance of the catalyst layers, as well as in the also relatively small power consumption of the common circulation system, because only partial quantities of the coolant are to be cooled down.

The individual cases 11a – 11e may contain not only mutually different quantities of the same catalyst, but also catalysts of different sorts. In addition, in providing covers (not represented) at the respective places of the reaction vessel, the cases may easily be removed in order to renew the used catalyst mass.

Figure 2:
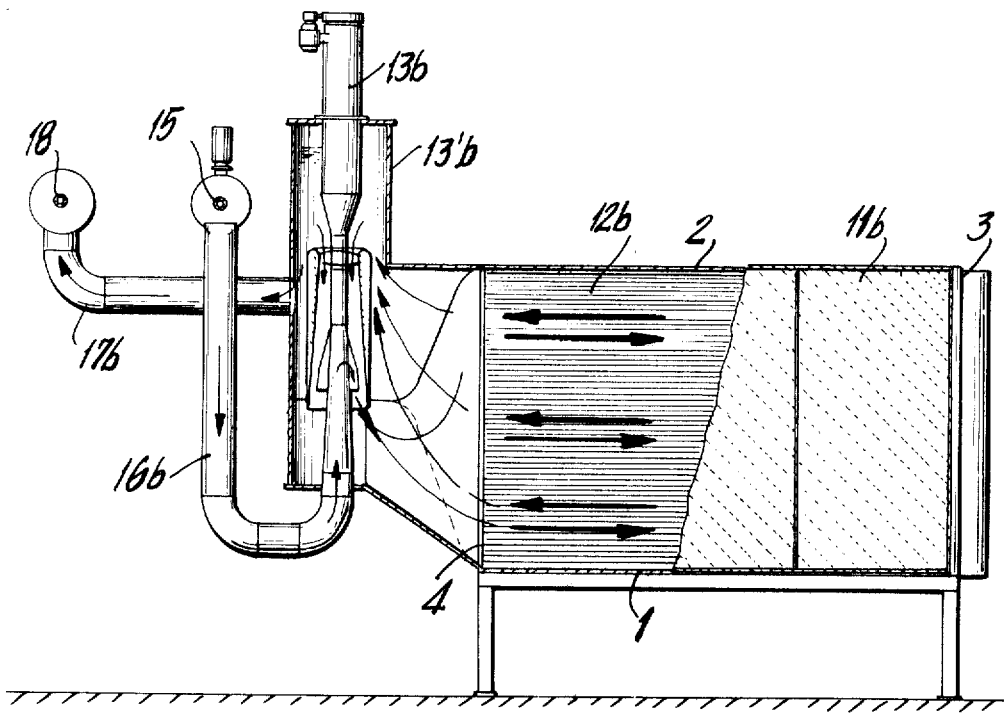
FIG. 2 is a sectional view taken along the line II—II of FIG. 1.
Figure 3:
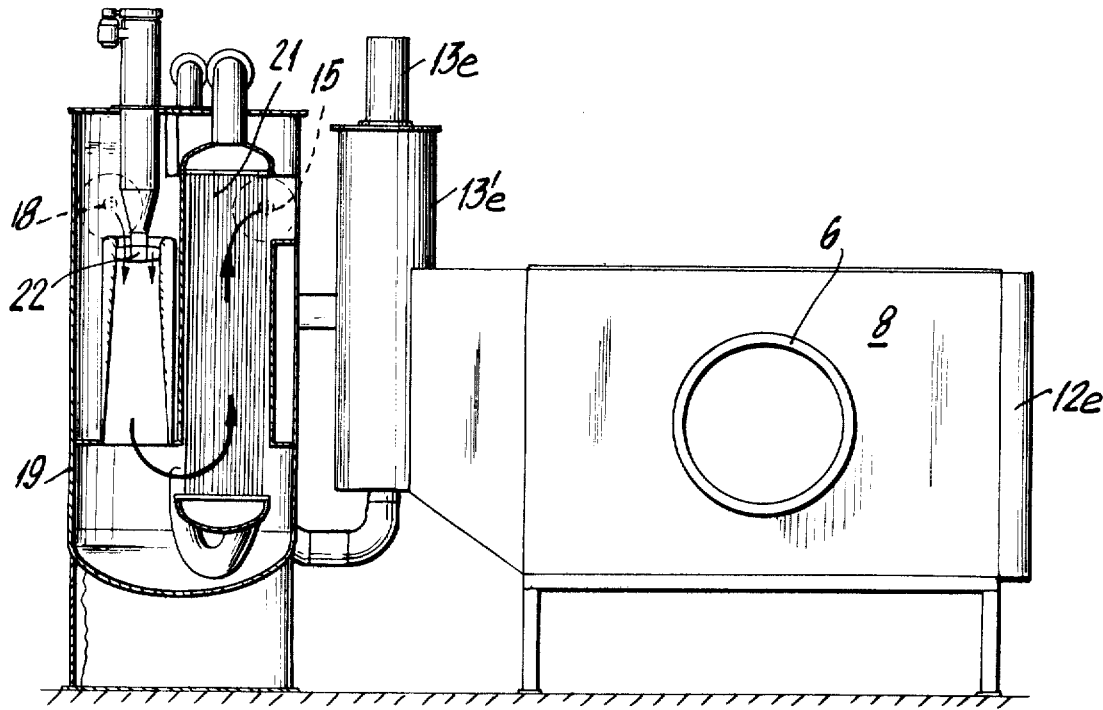
FIG. 3 is a partial front elevational and sectional view taken along the line III—III of FIG. 1.
Figure 4:
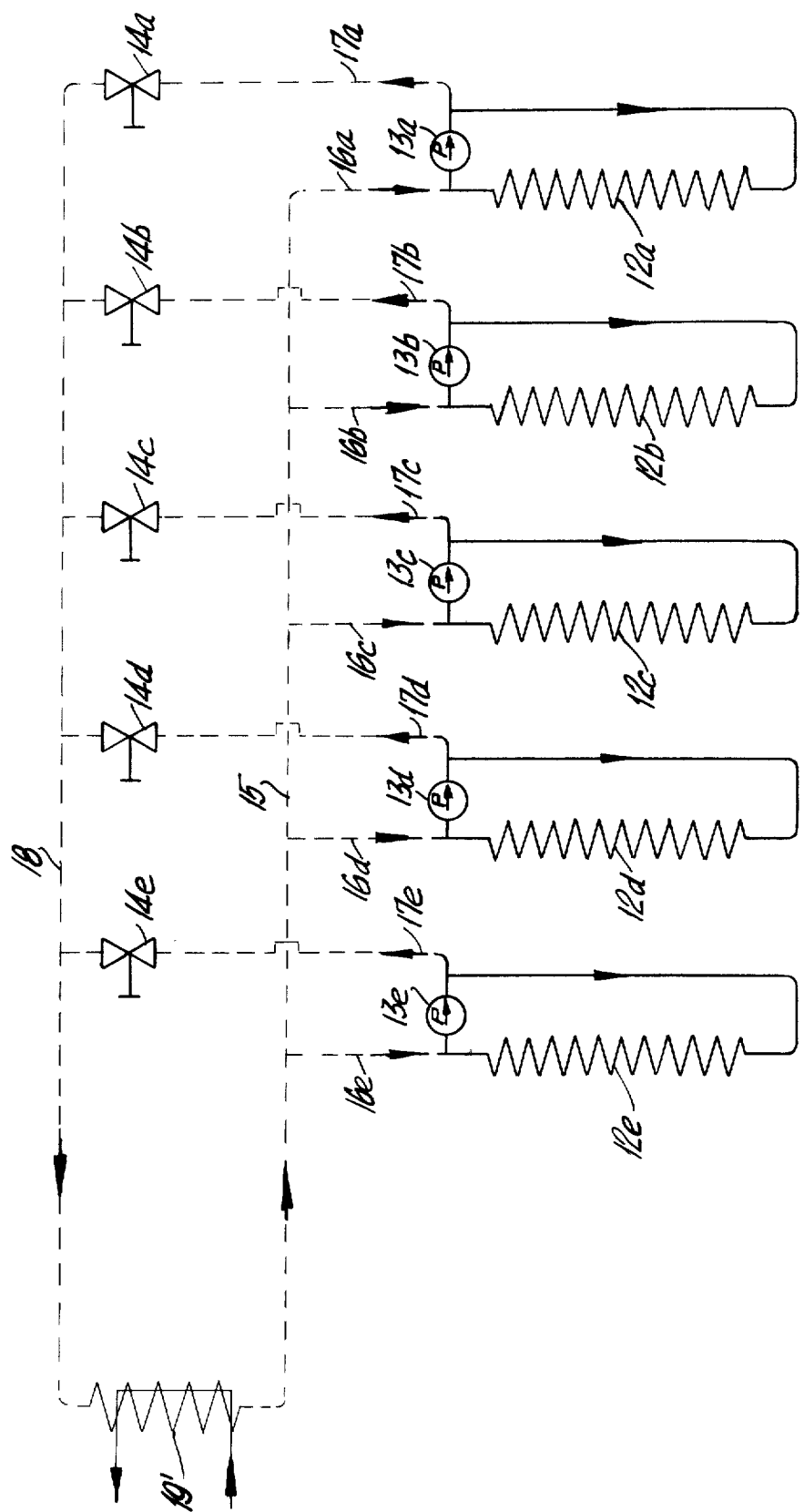
FIG. 4 is a circuit diagram of a modified arrangement of the circulation system.

As shown in FIG. 4, the valves 14a – 14e belonging to each of the coolers 12a – 12e and serving to control the partial coolant flows which are to be removed from the individual coolant circuits and cooled down in the common main heat exchanger 19', are mounted, contrary to the embodiment according to FIG. 1, i.e., not in the conduits 16a – 16e branched off the common supply conduit 15, but in the branch conduits 17a – 17e leading to the common return conduit 18. The advantage of such a design is the elimination of the common main circulation pump shown in FIG. 1. The pump can be omitted because, in this case, only the conduits 16a – 16e, branched off the supply conduit 15, are connected to the suction side of the pumps 13a – 13e, while the branch conduits 17a – 17e, leading to the return conduit 18, are connected to the pressure side thereof.

Figure 5:
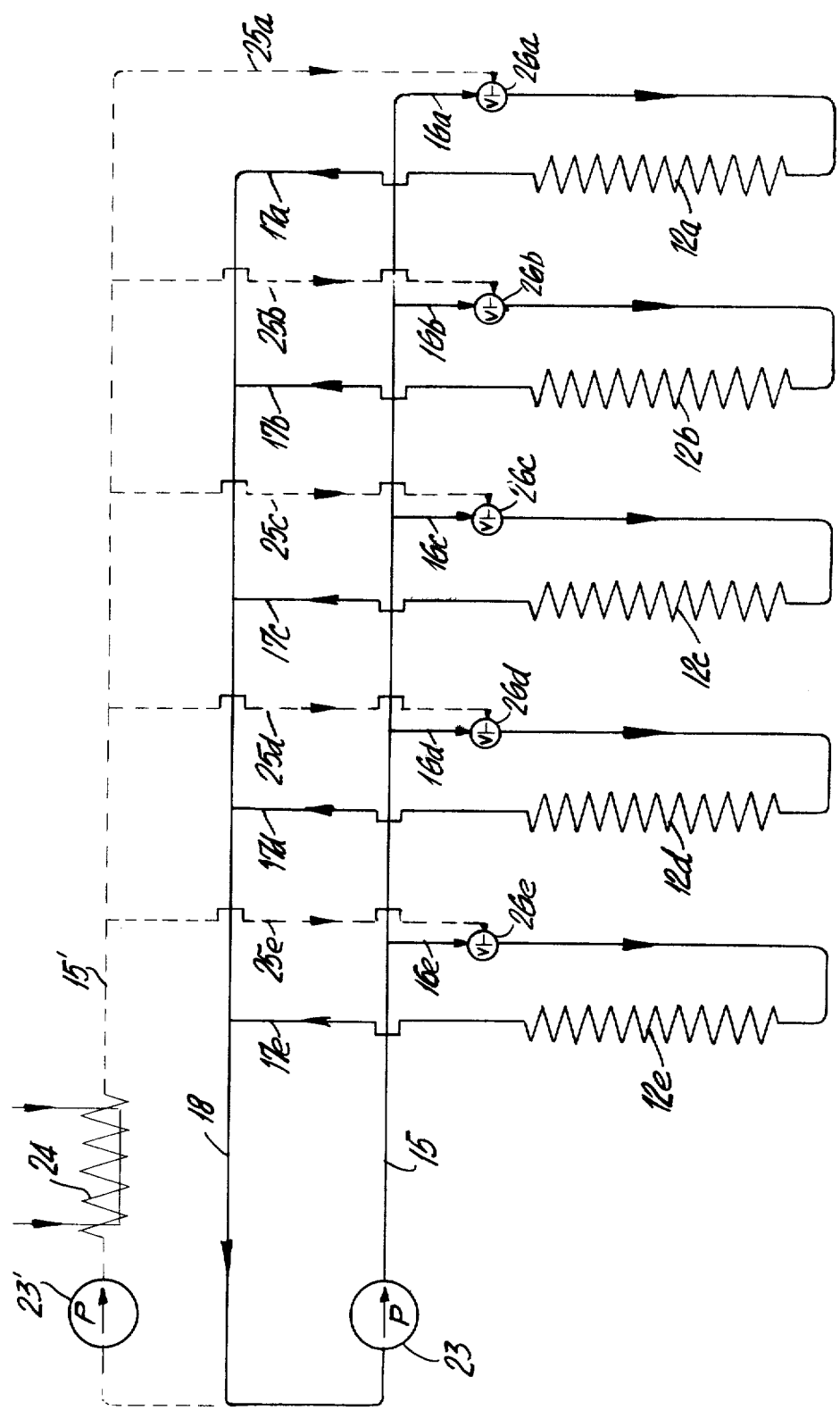
FIG. 5 is a circuit diagram of another arrangement of the circulation system.
Figure 6:
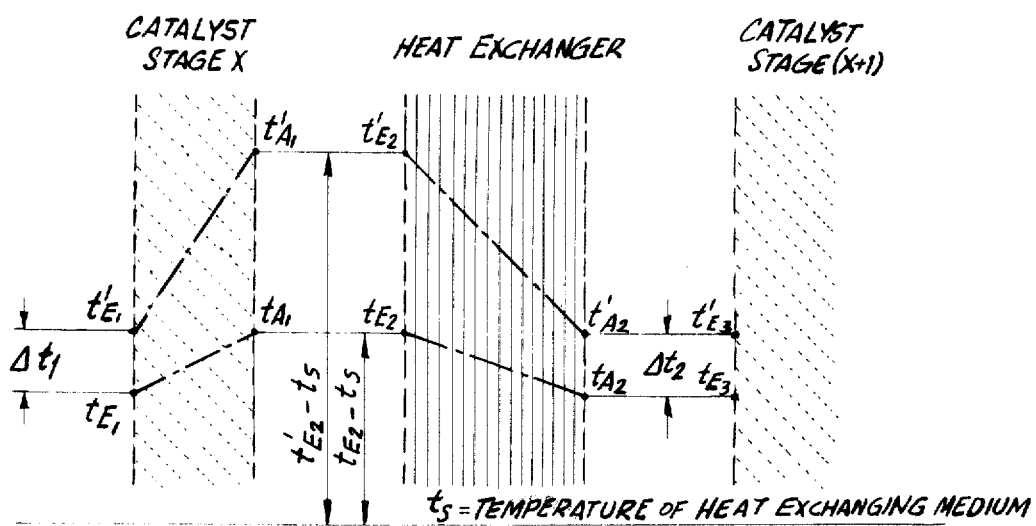
FIG. 6 is a diagram showing the temperature variations of the reaction gas passing through a stage.

According to FIG. 5, the common return conduit 18 is connected to two parallel supply conduits 15, 15' of which each comprises a pump 23, 23'. A heat exchanger 24 is mounted in the supply conduit 15'. Branch conduits 16a – 16e and 25a – 25e, respectively, lead from the two supply conduits 15, 15' to the individual coolers 12a – 12e, whose conduits 17a – 17e are connected to the return conduit 18. The ratio of the cooled and uncooled partial quantities of the coolant furnished to the coolers is controlled by three-way valves 26a – 26e which, like the valves 14a – 14e of FIGS. 1 and 4, are automatically adjusted by temperature sensors. Such a circuit is suitable for cases in which the temperatures of the individual stage circuits differ only little from one another.

A reaction apparatus, according to the invention, can be used in principle also for endothermic chemical reactions. In such a case, substantially only the coolers of the reaction gas are replaced by appropriate heaters, and the necessary auxiliary equipment is provided.

While specific embodiments of the invention have been shown and described in detail to illustrate the application of the principles of the invention, it will be understood that the invention may be embodied otherwise without departing from such principles.

What is claimed is:

1. A reaction apparatus for carrying out catalytic reactions in several stages, comprising a housing having a first end with a reaction gas inlet and an opposite second end with a reaction gas discharge, a plurality of catalyst-containing removable casings extending across said housing arranged in spaced locations between said inlet and said discharge and arranged to permit reaction gas flow therethrough, an auxiliary heat exchanger cooler located downstream of each casing and extending across said housing for the flow of reaction gas therethrough, a main heat exchanger cooler adjacent to said exterior of said housing, a supply conduit for a heat exchange medium having a boiling point over 100° at atmospheric pressure connected to said main heat exchanger cooler, a separate conduit connected to each of said auxiliary heat exchanger coolers for the separate circulation of a portion of the heat exchange medium through each auxiliary heat exchanger, each said separate conduit having a valve, a main return flow conduit, connected to said main heat exchange cooler, and an auxiliary heat exchange conduit connected between each of said auxiliary heat exchangers and said return flow conduit to said main heat exchanger cooler, an auxiliary heat exchanger circulating pump connected to each auxiliary heat exchanger for separately circulating the heat exchange medium therethrough, and a main circulating pump connected to said supply conduit.

2. A reaction apparatus for carrying out catalytic reactions in several stages, according to claim 1, wherein there are two supply conduits arranged in parallel, each having a circulation pump, only one of said supply conduits being connected to said main heat exchanger and each supply conduit being connected to said auxiliary heat exchangers and including branch conduits connected between said supply conduits and the individual heat exchangers having three-way control valves.

3. A reaction apparatus for carrying out catalytic reactions in several stages, according to claim 1, wherein said auxiliary heat exchangers comprise demountable nests of tubes.

4. A reaction apparatus for carrying out catalytic reactions in several stages, according to claim 1, wherein said housing includes a removable cover aligned with each of said casings to permit removal of said casings from said housing.

5. A reaction apparatus for carrying out catalytic reactions in several stages, according to claim 1, wherein said catalyst containing removable casings are of varying sizes so as to accommodate different quantities of catalyst.

6. A reaction apparatus for carrying out catalytic reactions in several stages, according to claim 1, wherein at least some of said catalyst containing removable casings contain different catalyst materials.

7. A method of operating a reaction vessel having alternately arranged containers of catalysts and auxiliary heat exchangers and a separate main heat exchanger connected to the auxiliary heat exchangers each having its own closed circulation system, comprising directing reaction gases through said vessel to cause the gases to successively pass through a plurality of catalyst containers and an auxiliary heat exchanger immediately after each catalyst container, circulating a cooling medium through said main heat exchanger and through a line common to each of said auxiliary heat exchangers, circulating the cooling medium through each closed auxiliary heat exchanger, periodically circulating a portion of the cooling medium from the line common to each heat exchanger separately into each heat exchanger, and periodically returning a portion of the medium from each auxiliary heat exchanger to a common line to said main heat exchanger, and controlling the rate of flow of the cooling medium in each heat exchanger and said main heat exchanger in order to provide desired cooling in each auxiliary heat exchanger.

* * * * *